May 15, 1934.      R. B. TEMPLE      1,959,116
ADJUSTABLE BRAKE ACTUATOR
Original Filed June 5, 1930     2 Sheets-Sheet 1

INVENTOR.
ROBERT B. TEMPLE
BY
John P. Tarbox
ATTORNEY

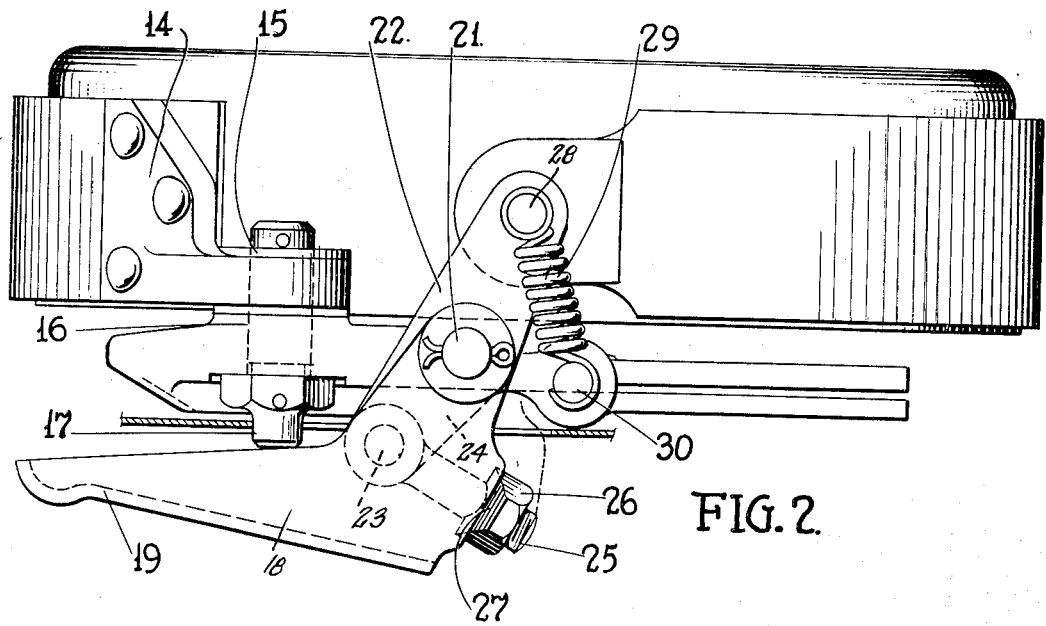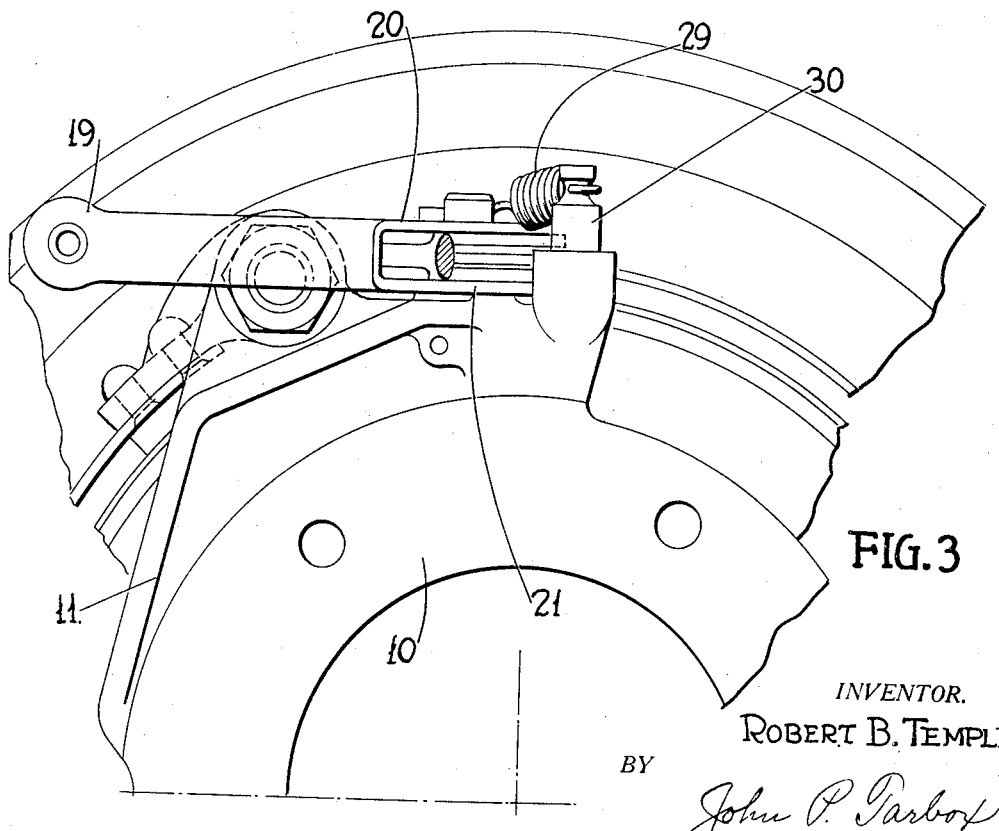

Patented May 15, 1934

1,959,116

UNITED STATES PATENT OFFICE 1,959,116

ADJUSTABLE BRAKE ACTUATOR

Robert B. Temple, Detroit, Mich., assignor to Budd Wheel Company, Philadelphia, Pa., a corporation of Pennsylvania Application June 5, 1930, Serial No. 459,328
Renewed July 12, 1932

11 Claims. (Cl. 188—196)

My invention relates to brakes, and it has been my object to provide a simple and convenient actuating mechanism in connection with a brake, having a simple and effective means of adjustment and a minimum number of parts.

Further objects and advantages of my invention will be obvious from a reading of the accompanying specification, in the light of the drawings, in which Fig. 1 is a perspective view of the improved features of my brake.

Fig. 2 is a plan view, and

Fig. 3 is a side elevation of the same.

Figure 1:
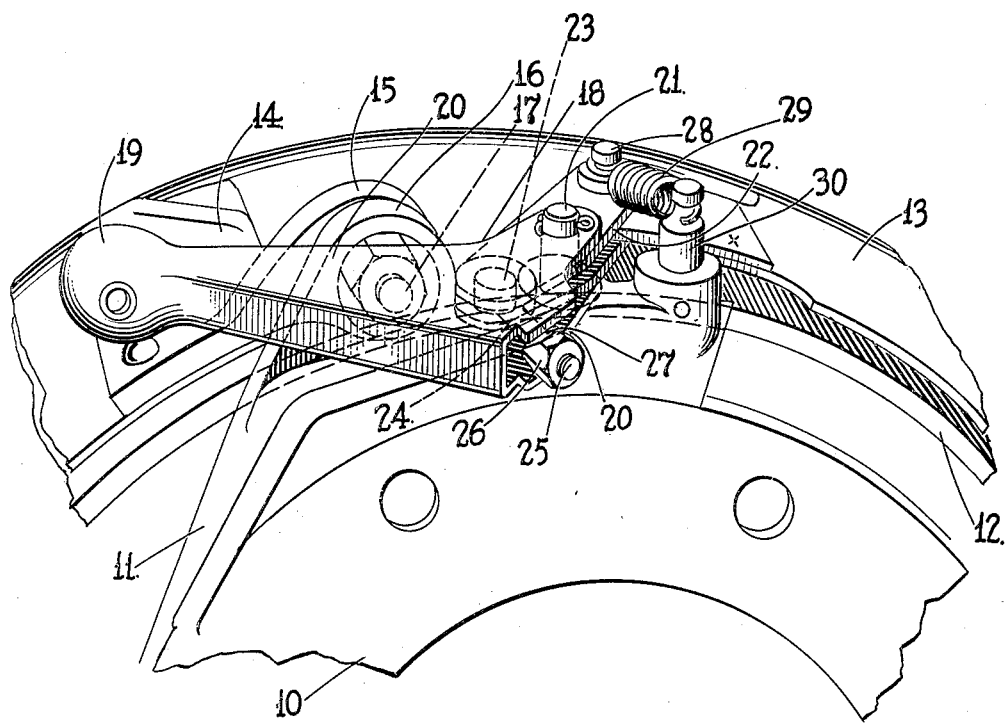

Referring to the drawings by reference characters, the numeral 10 indicates the anchor plate of my improved brake. This anchor plate is provided with a peripheral rib 11 which carries the actuating and anchor mechanisms of the brake. The brake drum 12 is surrounded by a band 13 which is illustrated in the drawings as a flexible external band. The anchor end of this band is attached to a lug 14 which receives the anchor reaction through an ear 15 preferably formed integrally therewith. This ear abuts a similar ear 16 formed on the anchor plate flange. A securing bolt 17 connects these ears and serves to align the band and anchor plate as well as receive the anchor reaction.

The improved features of my brake relate principally to the actuating mechanism. This mechanism includes a lever 18 having a head 19 and a pair of channeled sides 20 and is pivoted at 21. A second lever 22 is pivoted about the same pin 21 which acts as a pivot for the first lever and is connected through a pivot connection as indicated at 23, to an arm or link 24 which serves to adjust the position of the lever 22 relatively to the actuated end of the brake band. This lever 22 is preferably formed of two identical sections which abut opposite sides of the band and are swiveled thereto as indicated at 28.

The arm 24 is threaded at its outer end as indicated at 25 and an adjusting nut 26 is attached to its threaded end. This nut 26 is provided with a pair of beveled faces which fit within the walls 20 of the channeled section of the lever 18 with a wedging action. Spring 29 is attached to the stud 28 and to an anchor stud 30 secured to the brake anchor mechanism.

The levers 18 and 22 operate in effect as a single bell crank lever, the nut acting, upon adjustment, to adjust the angularity of the arm of the bell crank and the spring 29 acting to maintain the wedge shaped head of the adjusting nut between the channeled sections of the lever 18. We thus have two relatively adjustable levers acting in the actuation of brakes as one. When it is desired to adjust the brake the arm is thrown to the right with respect to its position shown in Fig. 1 and the nut turned the desired amount. Upon allowing the nut to return to its wedging relation to the lever 18 under the influence of the spring 29, the lever 22 will assume a new relationship to the end of the brake and to the lever 18, by reason of the adjustment.

It will be obvious to those skilled in the art that I have provided a simple, effective and inexpensive means for actuating and adjusting a brake shoe in relation to the drum against which it operates. While I have shown my improved actuating mechanism in connection with a flexible shoe of the external contracting type, it might readily be adapted to use in connection with other types of braking mechanism and I do not, therefore, wish to be limited to the particular type of brake disclosed.

Modifications will be obvious to those skilled in the art, and I do not, therefore, wish to be limited except by the scope of the sub-joined claims as interpreted in the light of the prior art and the generic spirit of my invention.

What I claim is:

1. In a brake, the combination of a brake shoe, an operating lever connected to the brake actuating mechanism, and a second operating lever connected to a portion of the brake shoe, said operating levers being adjustably interconnected and coaxially pivoted, said interconnection being at one side of the common pivot point and providing the sole engaging means between said levers.

2. In a brake, the combination of a brake shoe, an operating lever connected to a brake actuating mechanism, a second operating lever connected to the brake shoe, means interconecting said levers said interconnecting means including means for adjusting the effective length of said interconnection.

3. In a brake, the combination of a brake shoe, an operating lever connected to the brake actuating mechanism, a second operating lever connected to the brake shoe and coaxially pivoted with respect to the first operating lever, an arm interconnecting said levers and means carried by said arm for adjusting the effective length of said arm said means being a part of the interconnection.

4. In a brake, the combination of a brake shoe, an operating lever connected to the brake actuating mechanism, a second lever operatively connected with the brake shoe, an arm pivoted to one of said levers and an adjustable connection between said arm and the other lever.

5. In a brake, the combination of a brake shoe, an operating lever connected to the brake actuating mechanism, a second lever operatively connected with the brake shoe, an arm pivoted to one of said levers and an adjustable connection between said arm and the other lever, and means for locking the parts in their adjusted relationship.

6. In a brake, the combination of a brake drum, an external brake shoe, a lever for operating said shoe, a fixed fulcrum for said lever and means for adjusting the normal position of said lever relative to said fulcrum whereby to adjust the brake.

7. In a brake, the combination of a brake shoe, an operating lever connected to a portion of said brake shoe, a second operating lever connected to a brake actuating mechanism, said levers being co-axially pivoted about a fixed pivot, and means interconnecting said levers for relatively adjusting the same.

8. In a brake, the combination of a brake shoe, an operating lever connected to a portion of the brake shoe, a second operating lever connected to the brake actuating mechanism, said levers being co-axially pivoted about a fixed pivot, and adjustable means for securing said levers in interconnected relationship.

9. In a brake mechanism, the combination of a brake shoe, a brake housing bearing a fixed pivot thereon, a lever pivotally mounted upon said pivot and secured to said shoe, a bell crank pivotally mounted upon said pivot and secured to a brake actuating mechanism, and an adjustable link interconnecting said crank and first mentioned lever.

10. In a brake mechanism, the combination of a brake shoe, a brake housing bearing a fixed pivot thereon, a lever pivotally mounted upon said pivot and secured to said shoe, a bell crank pivotally mounted upon said pivot and secured to a brake actuating mechanism, an adjustable member interconnecting said crank and said lever, and means yieldably biasing said mechanism to an inactive position.

11. In a brake, the combination with a brake drum of an external contracting brake shoe, means for actuating said brake and means for transferring the actuating operation to the brake shoes comprising a bell crank connected through a fixed fulcrum to a brake shoe and the actuating mechanism, said bell crank comprising a lever pivoted about said fixed pivot and pivotally secured at one end to said shoe, a second lever pivoted to said fixed pivot and connected to said actuating means, and an adjustable link interconnecting said levers whereby to provide an adjustment for said brake through an adjustment of said bell crank relative to its fixed fulcrum.

ROBERT B. TEMPLE.